United States Patent [19]

Redman

[11] Patent Number: 5,575,238
[45] Date of Patent: Nov. 19, 1996

[54] FURNITURE-LIKE LITTER BOX HOUSING

[75] Inventor: Remington S. Redman, 12160 Colorado Blvd. #B203, Thornton, Colo. 80241, now by change of name from Remington S. Woodall

[73] Assignee: Remington S. Redman, Thornton, Colo.

[21] Appl. No.: 442,466

[22] Filed: May 16, 1995

[51] Int. Cl.⁶ .................................................. A01K 29/00
[52] U.S. Cl. .......................................................... 119/165
[58] Field of Search ..................................... 119/161, 165, 119/168, 15

[56] References Cited

U.S. PATENT DOCUMENTS

| | | | |
|---|---|---|---|
| 4,029,048 | 6/1977 | Gershbein | 119/165 |
| 4,522,150 | 6/1985 | Gershman | 119/165 |
| 5,184,568 | 2/1993 | Healey | 119/165 X |
| 5,315,965 | 5/1994 | Davis | 119/17 X |
| 5,337,700 | 8/1994 | Toft | 119/165 X |

Primary Examiner—Gene Mancene
Assistant Examiner—Thomas Price

[57] ABSTRACT

Furniture Like Litter Box Housing is an operational container that may resemble various types of house hold furniture. Its main purpose is to hide or conceal a cat litter box or animal food ware(s) while in use by the cat or small animal. The present invention provides, containment, seclusion, easy access for animal and consumer. It can come in various designs and colors that replicate house hold furniture. The Furniture Like Litter Box Housing has a rear entrance that is concealed from view, which comprises of a top piece (A) that supports the top opening lid (C), top back board support (B), and the side walls and center wall (D). The lower back board guard (F) is supported by side clip holders (G), that are attached to both side walls at the lower inside. The bottom (M) attaches to the bottom edge of the side walls and center wall (D), and front panel (L). The lower back board guard (F) can be removed by sliding up and out of the side clip holders, to easily access the inside compartment for cleaning, removal, and maintenance of a cat litter box, or animal food ware(s). The bottom (M) underside front will have a leg (H) attached at each corner. The bottom (M) underside rear will have a wheel set up at each corner. This will assist in stabilization and mobilization. Note*, the storage compartment in this present invention is optional.

8 Claims, 2 Drawing Sheets

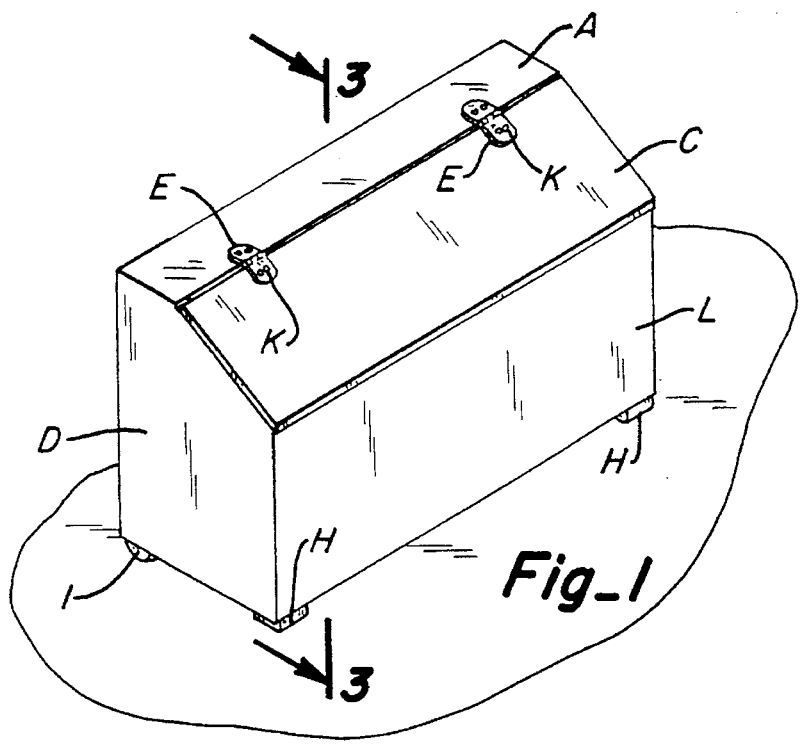
Fig_1
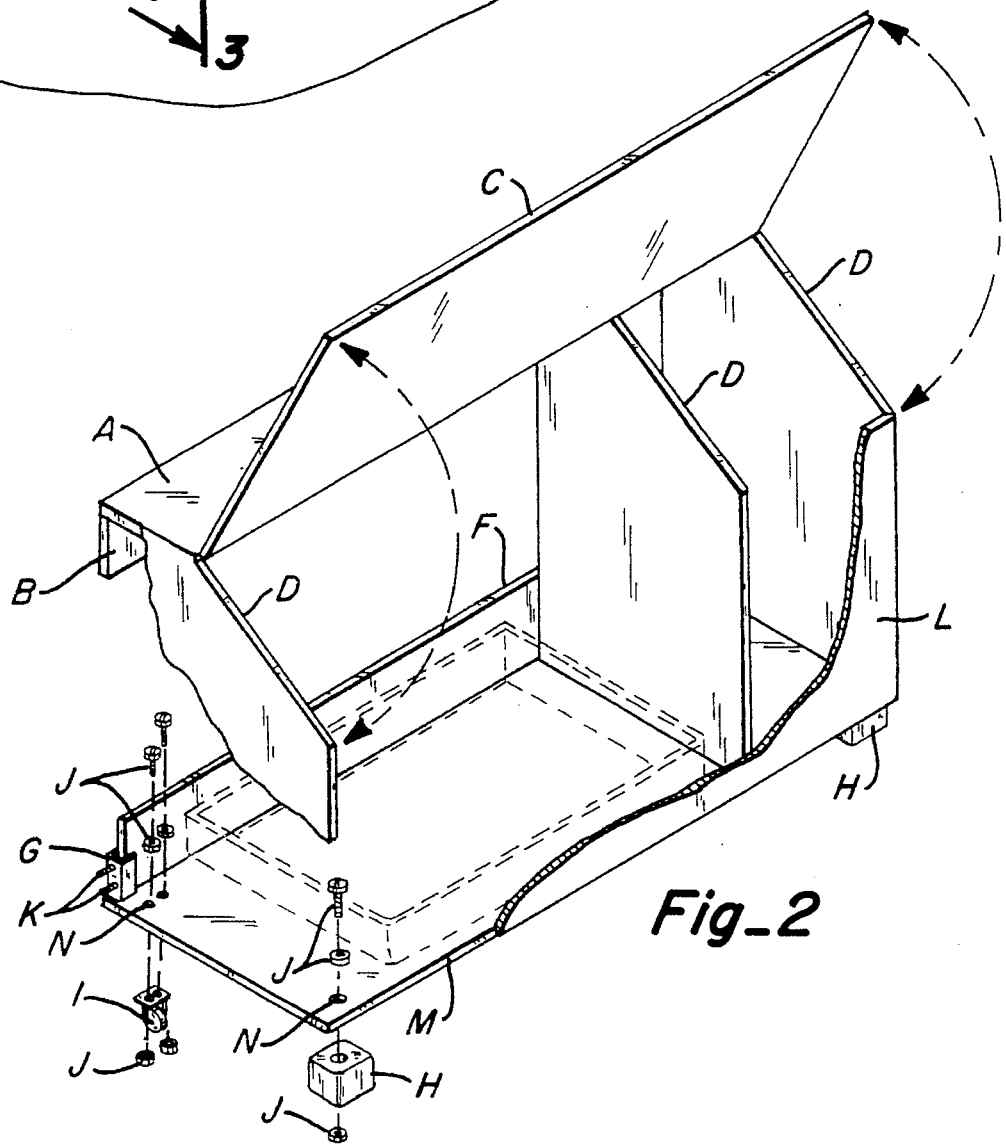
Fig_2

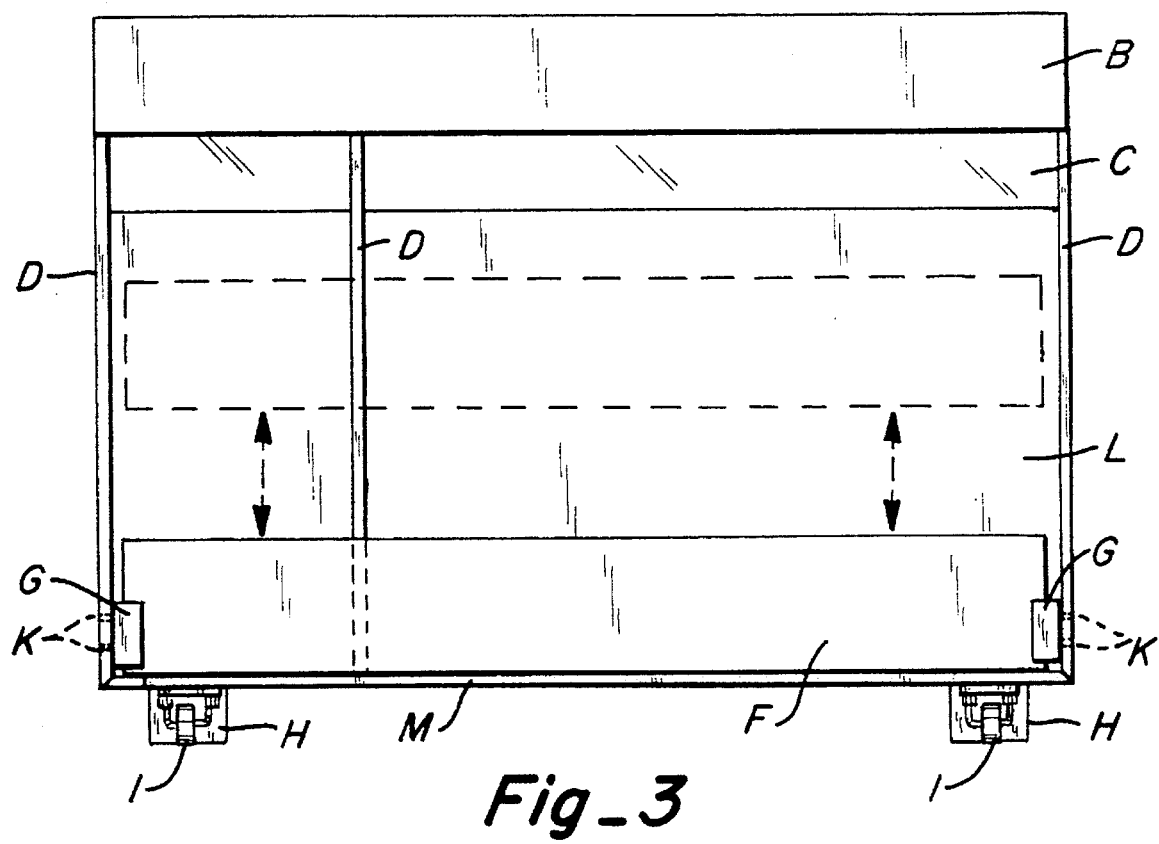

FURNITURE-LIKE LITTER BOX HOUSING

BACKGROUND—FIELD OF INVENTION

This invention relates to a type or types of furniture that may be used to enclose a cat litter box or animal feeding ware(s) from physical view, which can be accessed by the animal to use.

BACKGROUND—DESCRIPTION OF PRIOR ART

Grocery stores, retail stores, and pet stores commonly supply consumers with various types of cat litter boxes and animal feeding wares. Such items are used by the consumer's cat(s). But the Grocery stores, retail stores, and pet stores do not commonly supply consumers with enclosures that look like house hold furniture replicas that are made to conceal the cat litter box or animal food ware(s) from physical view.

Cat litter boxes and animal feeding ware(s) though necessary may appear unattractive and offensive to some consumers.

Thereafter, Inventors created several types of cat litter boxes and animal feeding ware(s), to be used for the animals to defecate or to consume food out of, which are usually in physical view. Some Inventors have created animal cat furniture used to play on, scratch on, and to sleep on, which appear to look like items that animals would use. Although all these inventions have an animal use, they are what they appear to be. There appears to be no inventions that resemble various types of household furniture replicas that are used to enclose cat litter boxes or animal food ware(s).

OBJECTS AND ADVANTAGES

Accordingly, the advantages of using my invention are:

(a) to provide a place to put the cat litter box or animal feeding ware(s), that would be attractive, and inoffensive to the human eye;

(b) to provide an easily accessible entrance for the animal to access the enclosure;

(c) to provide an enclosure that would hide the cat litter box or animal food ware(s) the consumer desires to insert into the enclosure;

(d) to provide easy access to the consumer to maintain or remove the cat fitter box, animal ware(s), or animal;

(e) to provide an enclosure that can resemble various types of furniture that can be made with wood or wood by products;

(f) to provide an enclosure that can be easily access to the consumer to clean;

(g) to provide an area that may be with in the enclosure for storage of cat litter, animal food, and their products;

(h) to provide various designs and colors that may resemble household furniture;

(i) to provide an easy access back opening to assist in air ventilation;

(j) to provide an easy access back opening that may be placed strategically near an electrical outlet, which the use of an electrical plug air deodorizer may be used to assist in air freshness:

(k) to provide in assisting in limiting the litter from spreading outside the enclosure;

(l) to provide an enclosure that is easy to move from one place to another place.

Further objects and advantages are to provide an eye pleasing piece of furniture that will completely hide or enclose a cat litter box or animal food ware(s), which can be made with or without a storage compartment (that would hold litter supplies or food supplies), which can be displayed anywhere in the home, or office environment (in any room), the consumer may desire.

The foregoing summary of the preferred embodiment is intended to broadly outline the details and features of the present invention. The summary is neither intended to define the invention, which is measured by the claims, nor is it intended to be limiting as to the scope of the invention in any way. Further details and features of the present invention will become apparent from a consideration of the following specifications, descriptions, drawings, and claims.

It is therefore the aim of the present invention to provide a specially designed piece of furniture that may resemble many different types of furniture capable of containing a cat litter box or animal food ware(s), which are both functional for the animal and the consumer, which will also appear pleasing to the human eye.

DESCRIPTION OF DRAWINGS

FIG. 1 is a perspective view of the litter box or animal ware(s) cabinet of the present invention.

FIG. 2 is a isometric view with hidden lines of the present invention.

FIG. 3 is a perspective view from the back side of the present invention.

Reference Alpha in Drawings

| | | | |
|---|---|---|---|
| A | Top piece | H | Legs |
| B | Top back board support | I | Wheel set up |
| C | Top opening lid | J | Nut, Washer, bolt |
| D | Side walls and center wall | K | Screw |
| E | Hinges | L | Front panel |
| F | Lower back board guard | M | Bottom |
| G | Side clip holder | N | Whole(s) |

DESCRIPTION—FIGURES

Referring to FIGS. 1 and 2, the embodiment of the present invention, the top piece (A) gives support to the top of the embodiment which secures the said lid piece (C), which lifts up to open and down to close, by hinges (E) that are secured by using screws (K). The side walls and center wall (D) that assist in the support of the embodiment attach to the top (A) and to the bottom (M) of the embodiment. The bottom (M) of the embodiment (front side) has a whole (N) drilled in each corner, which is used to attach the front legs (H) securely to the main embodiment by using a nut, washer and bolt (J). All edges that touch another that are meant to be secured, are secured in place by using wood glue and small furniture nails. The edges of the said embodiment may have mitered corners.

Referring to FIG. 3, of the embodiment of the present invention, the top back board (B) is securely attached to the inside edge of the side walls (D) and attaches to the top (A) (underside) along its length. The lower back board guard (F) fits inside the side walls (D) its entire length, which can be removed by lifting the lower back board support (F) up and out of the side clip holder (G). The side clip holders (G) are attached by screws to the lower side walls (D) inside. The interior wall (C) is recessed enough so the lower back board guard (F) can go across the length of the embodiment. In each corner at the back side of the bottom a whole(s) (N) will be drilled, which a wheel set up (I) will be secured to the bottom (M) by using a nut, washer and bolt (J), in each whole. The front panel (L) attaches to the front edges of both side walls and center wall (D), which also attaches to the front outside edge of the bottom.

SUMMARY, RAMIFICATIONS, AND SCOPE

Accordingly, the reader will see that the cabinet in these drawings is referring to only one design of many furniture designs that may be used. Furthermore the drawing simulates the cat box inside the embodiment of the cabinet, which shows an air space on the backside of the cabinet, which appears to assist in ventilation. This invention while in use is meant to be placed approximately four inches away from a permanent wall in or outside of a building. The reasoning being a cat will normally go through any space that their head can go through. Cats are usually nocturnal animals and have been known to have exceptional vision and coordination with very limited light. Therefore a light installation is unnecessary for the operation and use of this invention.

This invention has been tested for over two years (origination of full size operation device May 1, 1993) by two full grown cats using one cabinet enclosure for their litter box and one for their food, which has had positive results.

it permits the products inside the embodiment to be hidden from visual sight;

it provides an air space for ventilation, which seems to assist in limiting odor for both the cat box or food (Note*use a separate cabinet enclosure for a litter box and one for animal food ware(s) that contain food);

it provides a secluded environment, which also helps secure the contents from intrusion;

it permits the product embodiment to be made of various types of wood product, or other products the consumer may choose or desire;

it permits the product embodiment to replicate various designs and color of house hold furniture;

it permits easy access for the animal that is hidden from view;

it provides easy access for the consumer to view contents, replace contents, clean contents, clean the inside of the enclosure, and to extract animals;

it provides an optional storage compartment to store litter or food products;

it allows the embodiment to be placed strategically near an electrical outlet, which can hold an air freshness plug-in, which may assist in limiting odor;

to provide an eye pleasing piece of furniture, that will completely hide or enclose a cat litter box, or animal food ware(s) safely.

it allows the consumer to place the enclosure in any room of the house or office, it allows the consumer to match the furniture design the consumer desires.

Although the description above contains many specificity's, it is not intended to be limiting as to the scope of the invention but as merely providing illustrations of some of the presently preferred embodiments of this invention. It will be apparent to anyone skilled in the art that the same results could be achieved by using various shapes, designs, or materials, and that the improvements provided by the present invention could be adapted to any design the consumer desires.

Thus the scope of the inventions should be determined by the appended claims and their legal equivalents, rather than by the descriptions and examples given.

I claim:

1. An enclosure for retaining pet related articles, said enclosure including:

a top piece;

a lid including a top portion rotatably connected to said top piece for covering said enclosure and providing access to an interior of said enclosure;

a front panel;

a pair of opposing sidewalls each including a clip holder, said pair of opposing sidewalls connected by said front panel and said top piece;

a bottom spaced below said top piece and attached to said sidewalls to support the pet related articles;

a backboard guard slidably engageable with said clip holders and positionable between said opposing sidewalls; and a backboard support positioned between said opposing sidewalls and spaced from said backboard guide wherein an opening is formed between said backboard support and said backboard guide for access by the pet to at least some of the pet related articles within said enclosure.

2. An enclosure, as claimed in claim 1, further including:

a center wall positioned adjacent one of said opposing sidewalls and within said enclosure forming a storage compartment.

3. An enclosure, as claimed in claim 1, further including:

a plurality of wheels mounted to and supporting said enclosure for enabling movement of said enclosure.

4. An enclosure, as claimed in claim 1, further including:

at least one hinge connected to said top portion of said lid and to said top piece for rotatably connecting said lid to said top piece.

5. An enclosure for retaining pet related articles, said enclosure including:

a top piece;

a lid including a top portion rotatably connected to said top piece for covering said enclosure and providing access to the interior of said enclosure;

a front panel;

a pair of opposing sidewalls each including rear edges, said opposing sidewalls connected by said front panel and said top piece;

a bottom spaced below said top piece and attached to said sidewalls to support the pet related articles;

a backboard support positioned between and connected to said opposing sidewalls, said rear edge of said sidewalls and said backboard support defining an opening for access by the pet to the pet related articles within said enclosure; and a center wall positioned adjacent one of said opposing sidewalls and within said enclosure to form a storage compartment.

6. An enclosure, as claimed in claim 5, further including a plurality of wheels mounted to said enclosure for enabling displacement of said enclosure.

7. An enclosure, as claimed in claim 5, wherein:

said pair of opposing sidewalls each include a clip holder; and said enclosure further includes a backboard guard slidably engageable with said clip holders and positionable between said opposing sidewalls.

8. An enclosure, as claimed in claim 6, further including:

at least one hinge connected to said top portion of said lid and to said top piece for rotatably connecting said lid to said top piece.

* * * * *